United States Patent [19]
LeMarquand et al.

[11] Patent Number: 5,705,756
[45] Date of Patent: Jan. 6, 1998

[54] DIFFERENTIAL TORQUE MEASURING DEVICE

[75] Inventors: Valérie Evelyne LeMarquand; Guy Pierre Raymond Lucien LeMarquand, both of Villaz, France

[73] Assignee: Labinal, France

[21] Appl. No.: 495,485

[22] PCT Filed: Nov. 24, 1994

[86] PCT No.: PCT/FR94/01369

§ 371 Date: Sep. 18, 1995

§ 102(e) Date: Sep. 18, 1995

[87] PCT Pub. No.: WO95/14914

PCT Pub. Date: Jun. 1, 1995

[30] Foreign Application Priority Data

Nov. 26, 1993 [FR] France .................. 93 14168

[51] Int. Cl.[6] ........................................ G01L 3/00
[52] U.S. Cl. ........................... 73/862.332; 340/665
[58] Field of Search .............. 73/862.332, 862.331, 73/862.321, 779; 324/209; 340/665

[56] References Cited

U.S. PATENT DOCUMENTS

| | | | |
|---|---|---|---|
| 2,445,427 | 7/1948 | Godsey, Jr. | 73/862.332 |
| 2,461,685 | 2/1949 | Godsey, Jr. | 73/862.332 |
| 2,826,064 | 3/1958 | Hastings | 73/862.332 |
| 4,984,474 | 1/1991 | Matsushima et al. | |

FOREIGN PATENT DOCUMENTS

| | | |
|---|---|---|
| 2 612 633 | 9/1988 | France. |
| 2 689 633 | 10/1993 | France. |
| 35 32 351 | 3/1987 | Germany. |

OTHER PUBLICATIONS

Journal of Magnetism and Magnetic Material, vol. 104–107, Feb. 1992, Amsterdam (NL), pp. 1109–1110, XP000329324, V. LeMarquand et al., "New Structure of Magnetic Torque Sensor".

Patent Abstracts of Japan, vol. 8, No. 1, (P–246) (1438) 6 Jan. 1984, & JP, A 58 167 934 (Tateishi Denki K.K.), 4 Oct. 1983.

Primary Examiner—Ronald L. Biegel
Attorney, Agent, or Firm—Larson and Taylor

[57] ABSTRACT

A device measures the torsional moment being exerted on a shaft. The device includes two magnetic circuits, essentially cylindrical and arranged around the shaft, each equipped with at least one permanent magnet generating a magnetic flux and with a variable air gap on the rotor. Each variable air gap includes two facing relative parts each fastened to the shaft at respective points offset with respect to each other in the longitudinal direction of the shaft, in such a manner that torsion of the shaft leads to a modification of the air gap which differs depending on the direction of the torque exerted. The two magnetic circuits include a common central yoke part with which is associated at least one measurement means sensitive to the algebraic sum of the magnetic fluxes.

20 Claims, 9 Drawing Sheets

DIFFERENTIAL TORQUE MEASURING DEVICE

FIELD OF THE INVENTION

The invention relates to a magnetomechanical device allowing measurement of the torque transmitted by a rotating shaft or a similar mechanical element. This device finds its application everywhere it is deemed necessary to measure the torsional moment being applied to a shaft. It finds one particularly advantageous application in the field of motorized transport vehicles, more particularly in the automobile field, for example applied to the steering column of a vehicle equipped with power steering. Mention may also be made of all drive shafts and industrial shafts in general.

BACKGROUND OF THE INVENTION

The torque is a useful quantity in many respects. In point of fact, this quantity makes it possible to know the mechanical stresses to which the transmission shaft and the systems upstream and downstream of the shaft are subjected. In addition, knowing the torque makes it possible to deduce the acceleration of the system and even the power transmitted by the shaft. In this latter case, it is obviously necessary to know the speed of rotation of the shaft, but this is a quantity which is easy to measure.

A few devices already exist which allow access to the torque information.

The general principle stems from the laws of physics. The torque applied to a shaft causes an angular deformation, a torsion of this shaft, and the torsion is proportional to the torque.

For a shaft segment lying between sections A and B, the angle of the resulting torsion between A and B is proportional to the distance between A and B and to the torque transmitted and, in addition, depends on the cross-section of the shaft as well as on its constituent material.

Some torque sensors use two angular position sensors placed respectively at A and B. The difference in the angles measured gives the angle of torsion. This angle is always small, and therefore the position sensors must be very accurate. Whatever their technology, such torque sensors are necessarily expensive and quite fragile.

Some torque-meters working on this principle gain access to the difference in angular position by measuring the phase shift between two wave trains, these being generated by one means at A and another at B. These means may be, for example, two toothed rotor discs with, opposite, two toothed stator rings carrying a winding (Patent FR-A-1,542,815). The associated processing electronics are then quite complex and the quality of the result depends on the speed and decreases with it, even rendering measurement when stopped impossible. This is the case for all systems delivering information modulated by the speed of rotation.

The torque-meter proposed in Patent FR-2,631,702 with, at each end of the shaft, two toothed rotors placed opposite a stator equipped with electromagnet windings and with a magnetic circuit excited by magnets in order to form a homopolar machine makes it possible, by measuring the intensity of the current in circuits formed by the stator windings, to gain access to information about the torque which is then not very sensitive to the speed. However, the complexity of implementation of the stator windings and of the associated electronics makes such solutions not very attractive.

The device described in Patent Application DE-A-4,038,808, which includes a system of two toothed wheels facing each other at each end of the part capable of undergoing torsion, uses as detector two coils connected as a bridge. These two coils are supplied with an AC voltage and the voltage of the mid-point is amplitude modulated by the relative position of the teeth, and therefore by the torque. Calculation of the torque itself is therefore performed by means of a synchronous demodulation operation, which is a complex electronic processing operation. Other sensors use strain gauges fixed directly to the shaft. Such solutions require devices making it possible to supply sensitive rotor elements and also to extract the information from the moving parts to the fixed parts. These devices generally have wearing pieces, which is undesirable either with regard to lifetime or with regard to reliability.

A device similar to that in Application DE-A-4,038,808, using coils connected as a bridge, is also described in Patent Application DE-A-3,532,351.

Japanese Patent Application JP-A-58,167,934 describes a device belonging to the family of sensors using a very flexible piece capable of undergoing torsion in order to measure large angles of torsion. The torque is transmitted by a solenoidal spring and the measurement device uses the variation in reluctance of a toothing system under the effect of a relative angle of torsion. The relative variation about the reference position is small and limits the accuracy of the measurement.

U.S. Pat. No. 4,984,474 does not use the variation in air gap of two facing pieces. The device described uses a multipole magnet, the leakage fluxes of which are channelled by teeth.

The inventors have already described a device in the document "Variable magnetic circuit torque sensor", Journal of Applied Physics 70 (10), 15 Nov. 1991, pages 6630 to 6632 and in J. of Magnetism and Magmetic Materials 104–107 (1992), pages 1109 to 1110. This device includes two toothed rings moving with respect to each other under the action of a torque and thus modifying a magnetic circuit. The field source is a magnet, the magnetization of which varies with the torque. The information is deduced from a measurement of the induction in a plane air gap using a galvanomagnetic system (for example a Hall-effect probe). The probe sees an induction B which varies about a mean value $\bar{B}$ when the reluctance R of the magnetic circuit varies. Given the range of possible variations in the reluctance, the relative induction variations which stem there from barely exceed 10% ($\Delta B/\bar{B}=10\%$). The problem is therefore one of detecting quite small variations about a non-zero mean value (typically: if $\bar{B}=10$ mT then, for example, 9.5 mT<measured B<10.5 mT, which corresponds to a range of variation of $\Delta B=1$ mT).

Added to this is another problem, which is that of thermal drift. The magnet is, in point of fact, sensitive to temperature and its magnetization may vary. If, for example, the latter varies in such a way that the mean value of the induction varies by 1%—and therefore goes from 10 mT to 10.1 mT—this variation represents in fact a variation in the signal of 10% with respect to the extent of the measurement range (0.1 mT/1 mT). This is therefore detrimental to the generation of correct information.

SUMMARY OF THE INVENTION

The object of the present invention is therefore to improve this magnetic-circuit device so as to remedy the drawbacks which are associated with it.

Another object of the invention is to provide such an improved device delivering a continuous signal, the value of which is the image of the torque and, preferably, is directly proportional to the torque.

Yet another object of the invention is to provide such a device which is independent of the speed of rotation of the shaft.

Yet another object of the invention is to provide such a device which is particularly reliable, accurate and compact, yet inexpensive and easy to manufacture.

The subject of the present invention is thus a device for measuring the torsional moment being exerted on a shaft or a similar mechanical element, equipped with a magnetic circuit, essentially cylindrical and arranged around the shaft, which comprises a permanent magnet and, at the rotor, a variable air gap having two facing relative parts each fastened to the shaft at points offset with respect to each other in the longitudinal direction of the shaft, in such a manner that a torsion of the shaft leads to a modification of the air gap which differs depending on the direction of the torque exerted, and means for measuring the modification thus produced, characterized in that it includes two magnetic circuits which are each equipped with at least one permanent magnet generating a magnetic flux and with a variable air gap and which are arranged at points offset on the shaft in the longitudinal direction of the latter and in that these two magnetic circuits include a common central yoke part in which the magnetic fluxes of each of the circuits pass in opposite directions and with which is associated at least one measurement means sensitive to the algebraic sum of the magnetic fluxes.

The device according to the invention is note-worthy by the fact that it provides a differential value directly to the measurement means. The part common to the two circuits allows the fluxes from each to be subtracted in order to give a differential measurement. This common yoke part is defined by the existence of a flux-conducting region common to the two circuits, allowing the two fluxes to be combined. The measurement means is a sensor sensitive to the value of the resultant flux and to its direction, and therefore to the algebraic sum of the fluxes. A single measurement means is therefore sufficient to obtain the differential torque value, even though other complementary measurement means may be provided on the device in accordance with the invention.

In addition, and this is highly advantageous, such a structure makes it possible, to the first order, to overcome the effects of drift, in particular thermal drift. The magnets are in fact sensitive to temperature and their magnetization may vary. In the invention, since the magnetic fields are in opposite directions at the place where the measurement is performed, the variations in magnetization which may arise are subtracted out.

Preferably, the parts defining the air gaps are arranged so that the two air gaps are modified differently when a torque is exerted on the shaft, the application of a torque in a first direction leading to an increase in the reluctance of one air gap and a decrease for the other, and conversely for a torque in the opposite direction, thereby making it possible to effect a differential measurement. In order to do this, the parts forming an air gap have an initial position which is not symmetric with respect to a plane separating these parts. Also preferably, the two air gaps exhibit a symmetry with respect to each other. The symmetry of the air gaps with respect to each other is understood to mean equivalent air gaps, something which may especially be obtained using air gaps whose geometries exhibit a symmetry or a reverse, aligned or angularly offset symmetry.

Preferably, the air gaps are designed so that, in the absence of torque being exerted on the shaft, the measurement means reads a zero reference value (corresponding to equal fluxes in the two circuits) on either side of which lie the increasing values of torque corresponding to the torques exerted respectively in one direction and in the other direction.

Means may advantageously be provided for accurately adjusting the flux to zero. All means known per se intended to increase or decrease the power of each magnet, in particular magnetic shunts, may especially be used.

This structure is such that the induction seen by the measurement means varies about a zero reference value, while always remaining independent of the speed of rotation. This is highly advantageous in the sense, especially, that this makes electronic processing easier and makes it possible to have much greater relative variations in the induction and thus to increase the extent of the measurement range.

The device in accordance with the invention may also comprise means allowing adjustment, especially angular adjustment, of the position of the parts forming the air gaps. It is possible, especially if another torque value is of particular interest, to modify the air gap by angularly offsetting the respective parts in such a way that these parts are symmetric from one air gap to another (symmetry of the air gaps with respect to each other) for that particular torque value which then corresponds to a zero information value, that is to say to a zero flux resultant. Of course, the measurement device may be specially designed from the start to have a zero value for such a particular torque value.

The stator of the two magnetic circuits may advantageously be formed as a single piece together with a common central yoke with which it is advantageous to associate the measurement means.

Preferably, the parts defining an air gap extend in the form of a ring concentrically with the axis of the shaft. The parts of any one air gap may especially lie within planes, orthogonal to the shaft, which are different, that is to say offset and mutually parallel, or both in the same plane orthogonal to the shaft, and therefore lying radially on concentric circles of different radii.

According to the preferred embodiment of the invention, the air gaps are each formed by a set of teeth extending in the form of a ring a short distance from the shaft. The toothing may have any appropriate geometrical shape, in particular one that is square, rectangular, trapezoidal or delimited by circular arcs. Preferably, the width of the teeth is between 20 and 35% of the pitch of the teeth and more particularly between approximately 25 and 30%.

In order to establish the non-symmetric initial position of the parts defining the air gaps, the opposed teeth forming an air gap are angularly offset, as is especially described in more detail later with regard to FIG. 2.

The permanent magnets may be placed just as well on the rotor as on the stator, depending, for example, on the technical constraints or choices. They may be cylindrical magnets made as a single component or each may consist of a plurality of equivalent individual magnets, especially having the same parallel magnetizations and lengths within each group. It may be advantageous to associate with these magnets the adjustment means which make it possible to balance the device in the absence of torque so as to make the flux in the central yoke zero.

The parts defining the air gaps, especially the toothing, may be fixed to the shaft by means of rotor yokes, possibly separated from the shaft by spacers, especially non-magnetic spacers, stator yokes being arranged so as to face the rotor yokes. If required, it may be envisaged making recesses in the shaft regions which are opposite the rotor yokes and are delimited by the non-magnetic spacers.

The magnets may be carried on the stator by three stator yokes, two end ones and one central one, which are associated with three rotor yokes, two end ones and one central one.

As a variant, the device may comprise a single stator yoke placed opposite the rotor yokes, especially five in number, which then carry the magnets.

The respective widths of the facing yokes may be chosen to be different in order to limit the influence, on the measurement, of the axial play between rotor and stator.

The measurement means may advantageously be a galvanometric means chosen from the group formed by Hall-effect probes, magnetoresistors and similar means.

The invention will now be described in more detail by means of non-limiting embodiments with reference to the appended drawings.

DETAILED DESCRIPTION OF THE PREFERRED EMBODIMENTS

Figure 1:
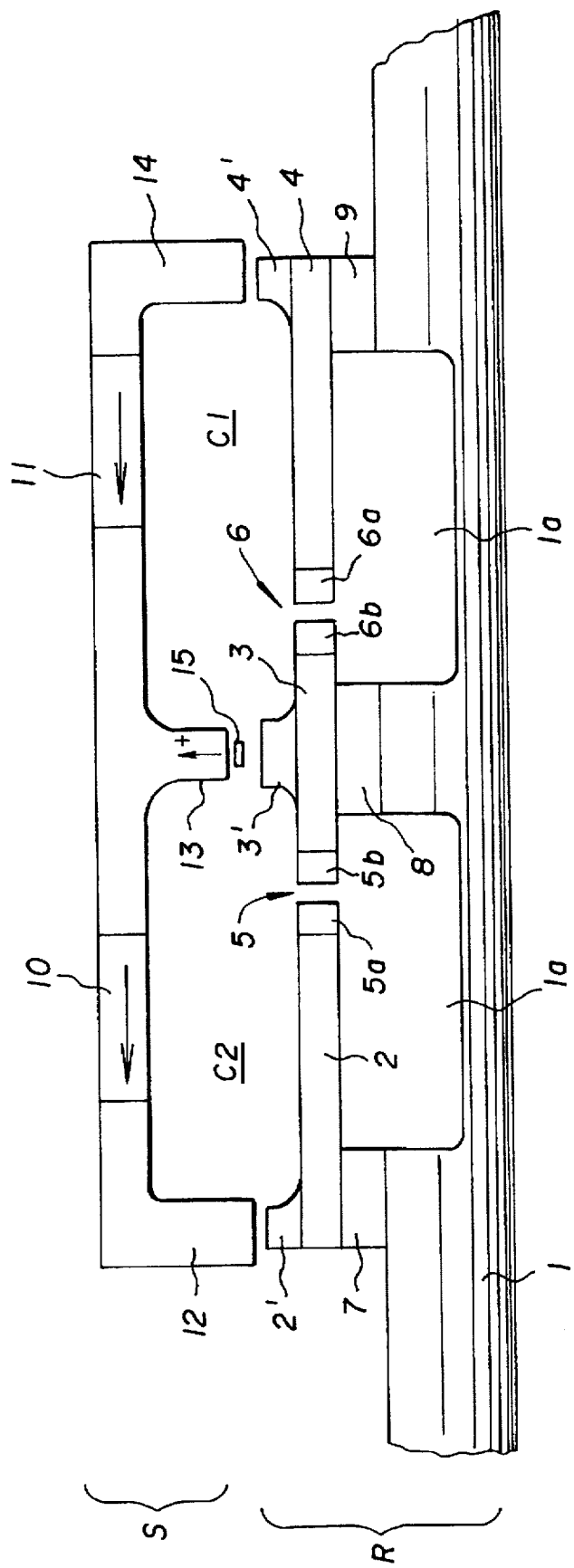
FIG. 1 represents a partial sectional view, along the longitudinal direction of the shaft, of a first embodiment of the invention.

FIG. 1 shows a section of a torsion shaft 1 on which is mounted a device in accordance with a first embodiment of the invention. For reasons of clarity, recesses 1a are depicted on the shaft so as to make the phenomena of torsion at various points on the shaft understandable. They are not absolutely essential but, in some cases, it may be desired to increase the susceptibility to torsion, and recesses of this type may then be provided.

This device comprises, on the rotor, three magnetic-circuit elements 2, 3 and 4 (hereinbelow, rotor yokes, incorporating yoke parts 2', 3' and 4') fixed to the shaft 1 in a cylindrical arrangement about the latter by means of non-magnetic spacers 7, 8 and 9, forming the magnetic circuit on the rotor designated by the reference R. The fixing may be achieved, for example, by pins or similar means. The rotor yokes 2 and 3 and 3 and 4 respectively, are separated by a set of teeth, respectively 5 and 6, which will be described in detail later in conjunction with FIGS. 2 and 3. The stator of the device includes a cylindrical magnetic circuit S (for the magnetic circuit on the stator) possessing two permanent magnets 10 and 11 and three stator yokes 12, 13 and 14. The constituent elements, respectively 4, 14, 11, 13, 3, 6 and 2, 5, 3, 13, 10, 12, define a first magnetic circuit C1 and a second magnetic circuit C2 of the opposite direction in the region of the central yokes 3 and 13. It may be pointed out that the constituent elements 3 and 13 are common to them. A magnetosensitive means 15, (for example a Hall probe or a magnetoresistor) is fixed to the common central yoke 13 (stator yoke). This means is sensitive to the resultant of the fluxes of the two circuits.

FIG. 1 shows that the facing surfaces of the yokes 12, 13, 14 and of the yoke parts 2', 3', 4' respectively have different widths so as to limit the influence of the axial play between rotor and stator on the measurement.

Figure 2:
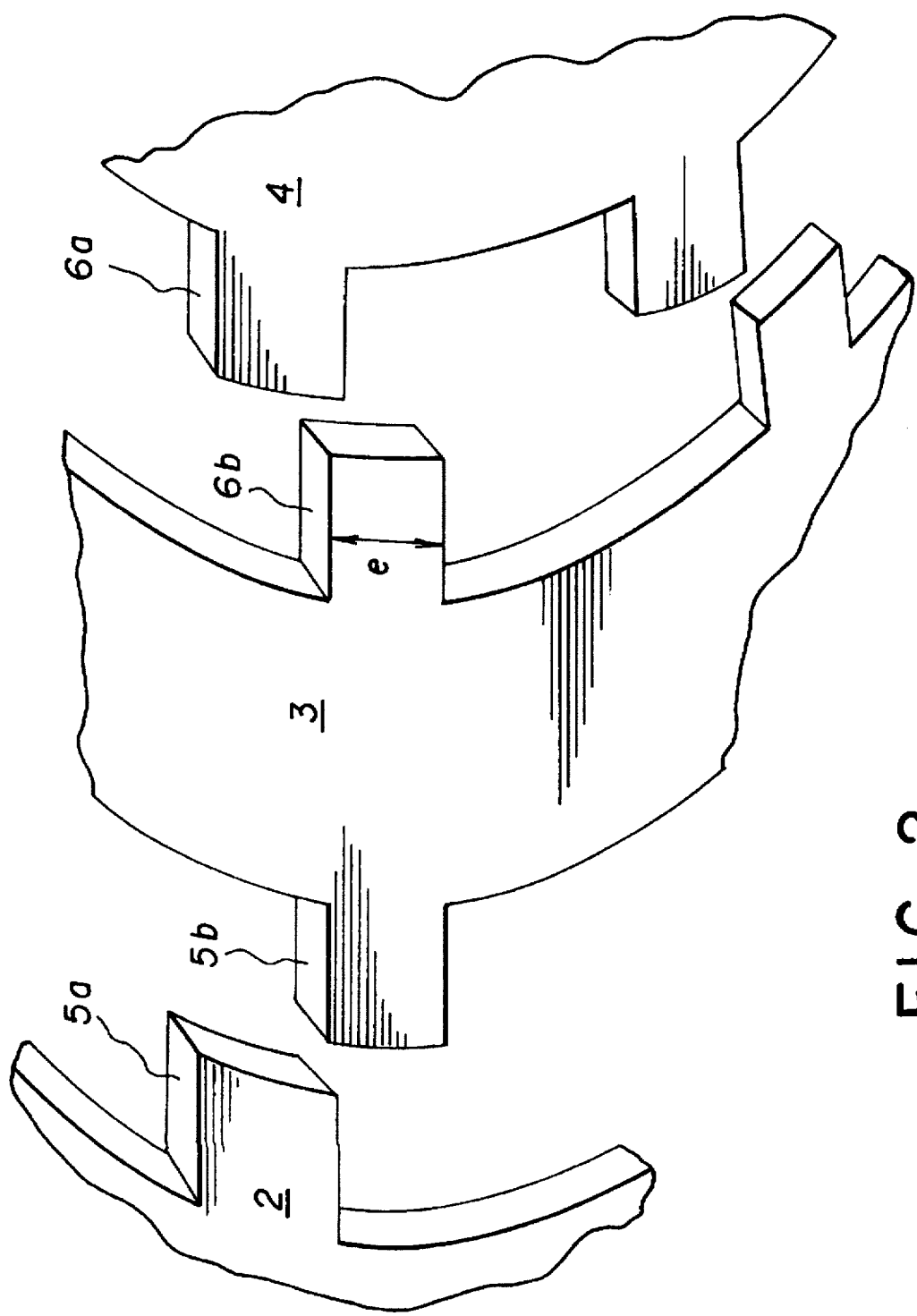
FIG. 2 is a diagrammatic view of two sets of teeth of the device of FIG. 1, at rest.

FIG. 2 represents diagrammatically the two air gaps delimited by the sets of teeth 5 and 6, showing a series of teeth 5a, 5b for the circuit C2 and 6a, 6b for the circuit C1, their geometrical shape and their respective arrangements in space.

The teeth here are square, but they may have any suitable shape. At rest, that is to say in the absence of torque, the teeth 5a and 6a are angularly offset in an identical manner with respect to the aligned teeth 5b and 6b carried by the central rotor yoke 3. In this position, the air gaps are strictly identical (symmetric); the fields created by the magnets 10 and 11 have opposite directions in the common central yoke 13 and their fluxes cancel out. The measurement means 15 therefore detects a zero value. It may be judicious to associate, with the magnets, adjustment means known per se (not shown), for example magnetic shunts, making it possible to balance the device, in order, before a measurement, to obtain a strictly zero value of flux. These means therefore serve to equalize the fluxes generated in C1 and C2 in the absence of torque.

As shown by an arrow in the common central yoke 13, a positive flux direction has been arbitrarily chosen which corresponds to the direction of the field created by the magnet 10 in C2 if it were considered alone.

Figure 3:
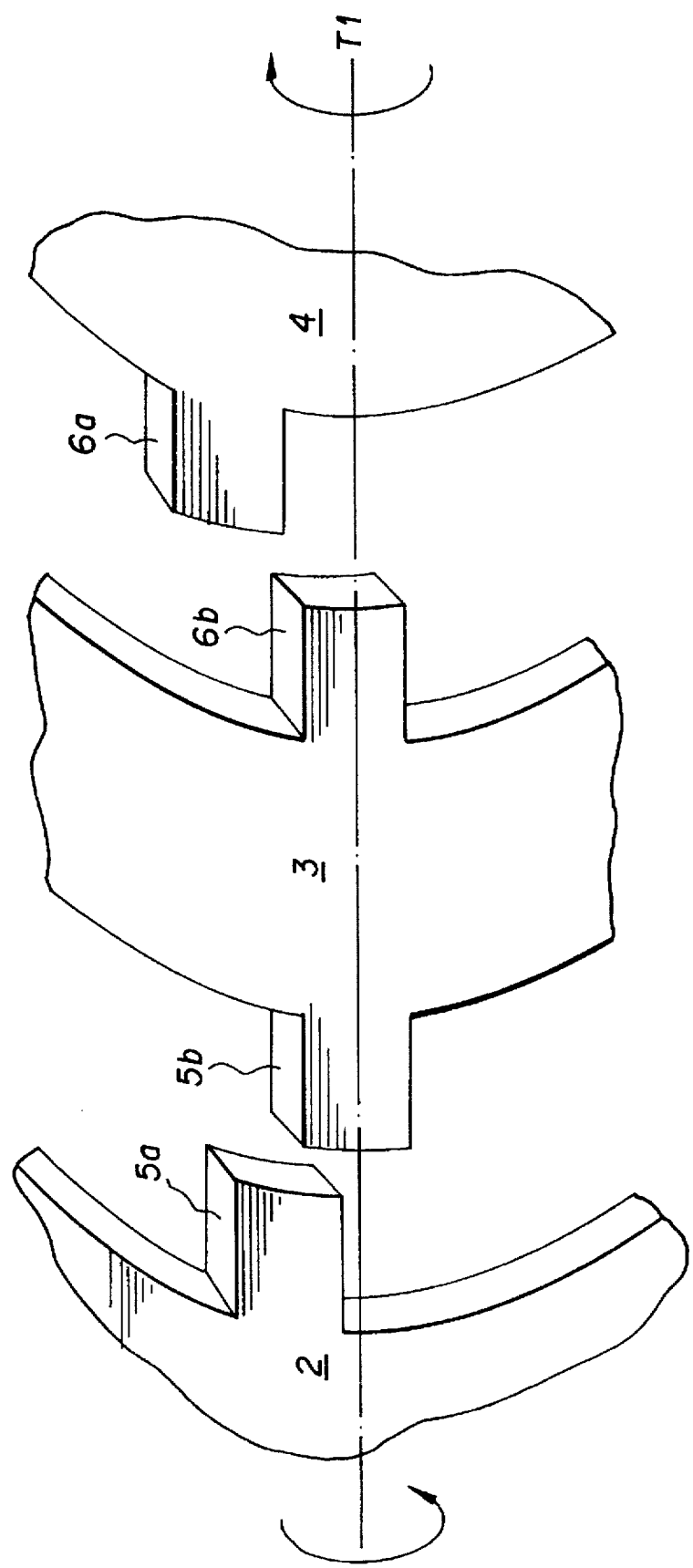
FIG. 3 is a view similar to that of FIG. 2, but in the presence of a torque being exerted on the shafts.

In FIG. 3, a force is applied to a first end of the shaft 1 in the direction indicated by the arrow T1 to create therein a torsional torque, and a resulting torsion of the shaft 1. The angular offset of the teeth 5a and 6a with respect to the teeth 5b and 6b (which is initially identical) is modified and is so in a different manner, that is to say in a more pronounced manner for the teeth closest to the point of application of the torque, in this case the teeth 6a with respect to the teeth 6b. This results here in the greater opening of the air gap of C1 compared to that of C2. The reluctance of C1 increases while that of C2 decreases and the resultant flux in the common central yoke 13 passes in the positive direction. The measurement means 15 detects this positive direction and the resultant value of the flux which is a function of the torque.

If the torque is exerted in the opposite direction, it is immediately understandable that the air gap of C1 closes up while that of C2 opens up, which results in a decrease in the reluctance of C1 and an increase in that of C2. The resultant flux will therefore be in the negative direction.

The dimensions and shapes of the toothing are advantageously chosen so that the variations in the reluctances generate in the common central yoke 13 a flux proportional to the angle of torsion, and therefore to the torque.

The width 1 of the teeth (see FIG. 2) is preferably between approximately 20 and 35% of the pitch of the teeth and more particularly between approximately 25 and 30%. Moreover, the person skilled in the art knows perfectly well how to modify the toothing depending on the extent of the measurement range and on the measurement accuracy that are desired. He knows, for example, that the measurement accuracy increases with the number of teeth, while at the same time the extent of the measurement range decreases.

It is preferable to use a linear Hall probe as the measurement means, by virtue of which probe an electrical signal proportional to the torque exerted is obtained.

The relationship between the applied torque C and the angle of torsion α is:

$$\alpha = \frac{L}{GJ} C$$

G=transverse elastic modulus of the shaft
J=moment of inertia
L=distance of the two points on the shaft between which the torque is considered to be applied.

The strain of the shafts is generally of the order of a few degrees, especially between 1° and 5°. This is quite a general constant in the design of shafts, which takes into account the dimensions and mechanical properties of the shafts as a function of the power to be transmitted.

The measurement device according to the invention will be easily adapted dimensionally to any type of shaft so as to exhibit a sensitivity of the order of one degree, especially between approximately 1° and 5° under the conditions of use of the shaft.

The suitable length (that is to say the distance separating the points of attachment of the spacers 7 and 9) of the measurement device is specially defined, for a given shaft, by the length of shaft corresponding to the chosen sensitivity, for example to a torsion between 1° and 5°. These are parameters perfectly well known to those skilled in the art.

Figure 12:
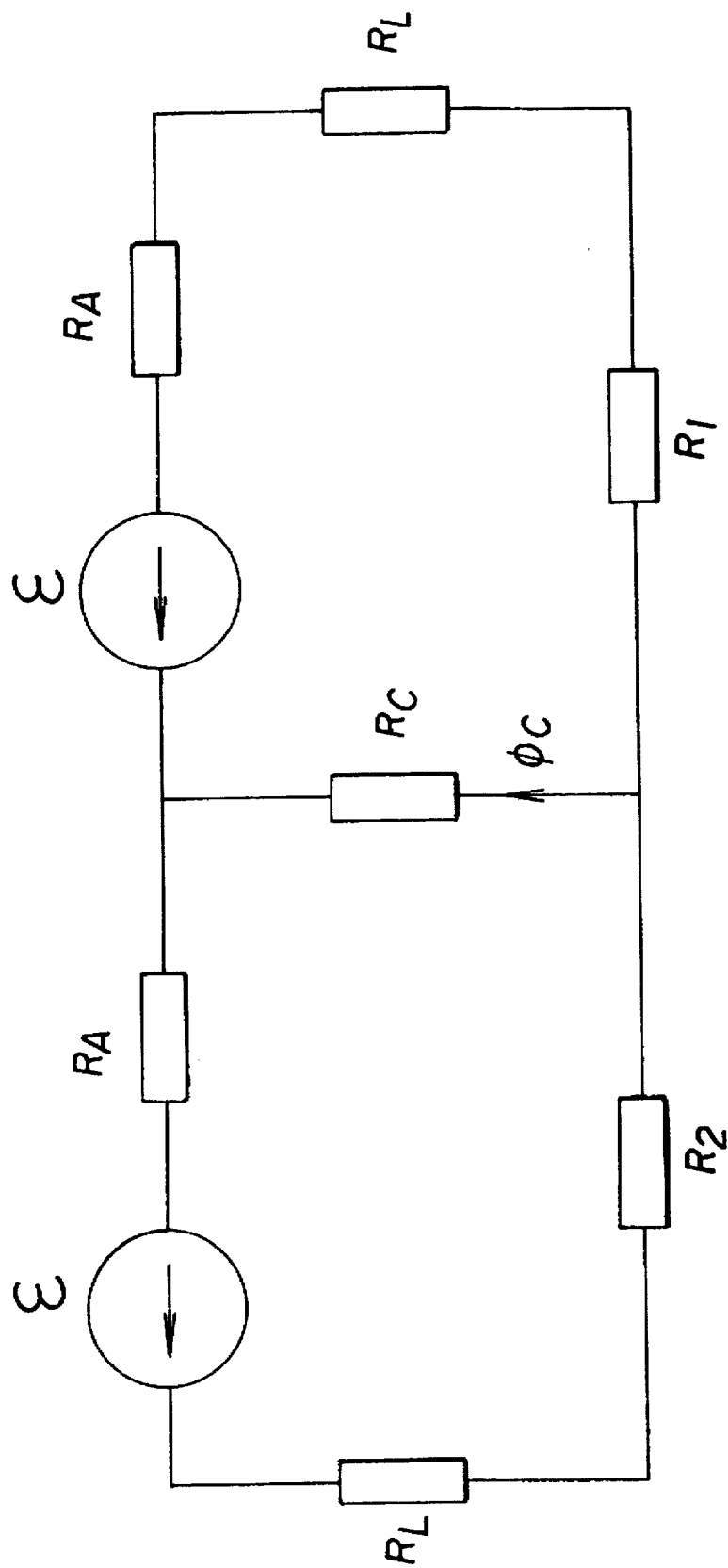
FIG. 12 represents the electrical diagram of the magnetic circuit according to FIG. 1, in an axial plane.

The magnetic flux $\phi_c$ in the central air gap formed between the parts 3,3' and 13, read by the measurement means 15, is given by the following formula, with reference to the electrical circuit diagram of FIG. 12:

$$\phi_c = \frac{\epsilon (R_1 - R_2)}{(R_L + R_A + R_1)(R_L + R_A + R_2) + R_c [2(R_L + R_A) + R_1 + R_2]}$$

in which:
ε=magnetomotive force of the magnet
$R_A$=reluctance of the magnet
$R_f$=reluctance of the lateral transfer air gap
$R_C$=reluctance of the central air gap
$R_1$=equivalent reluctance of one toothed system
$R_2$=equivalent reluctance of the other toothed system.

Figure 4:
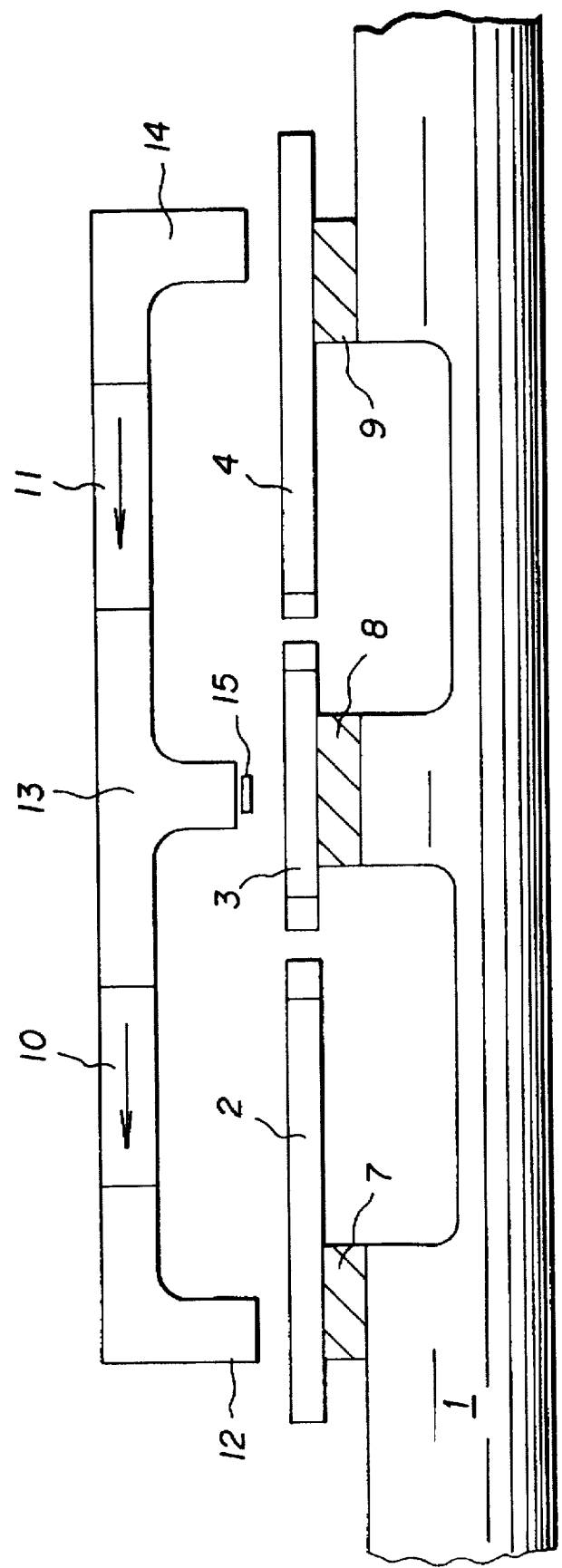
FIGS. 4 and 5 represent two other embodiments of the invention, in a representation similar to that of FIG. 1.

FIG. 4 shows an embodiment variant which differs from the previous embodiment by the fact that the circuits are simplified by eliminating the yoke parts identified as 2', 3' and 4' in FIG. 1. Here too, the facing yoke surfaces have different dimensions, which limits the influence of the axial play between rotor and stator on the measurement.

Figure 5:
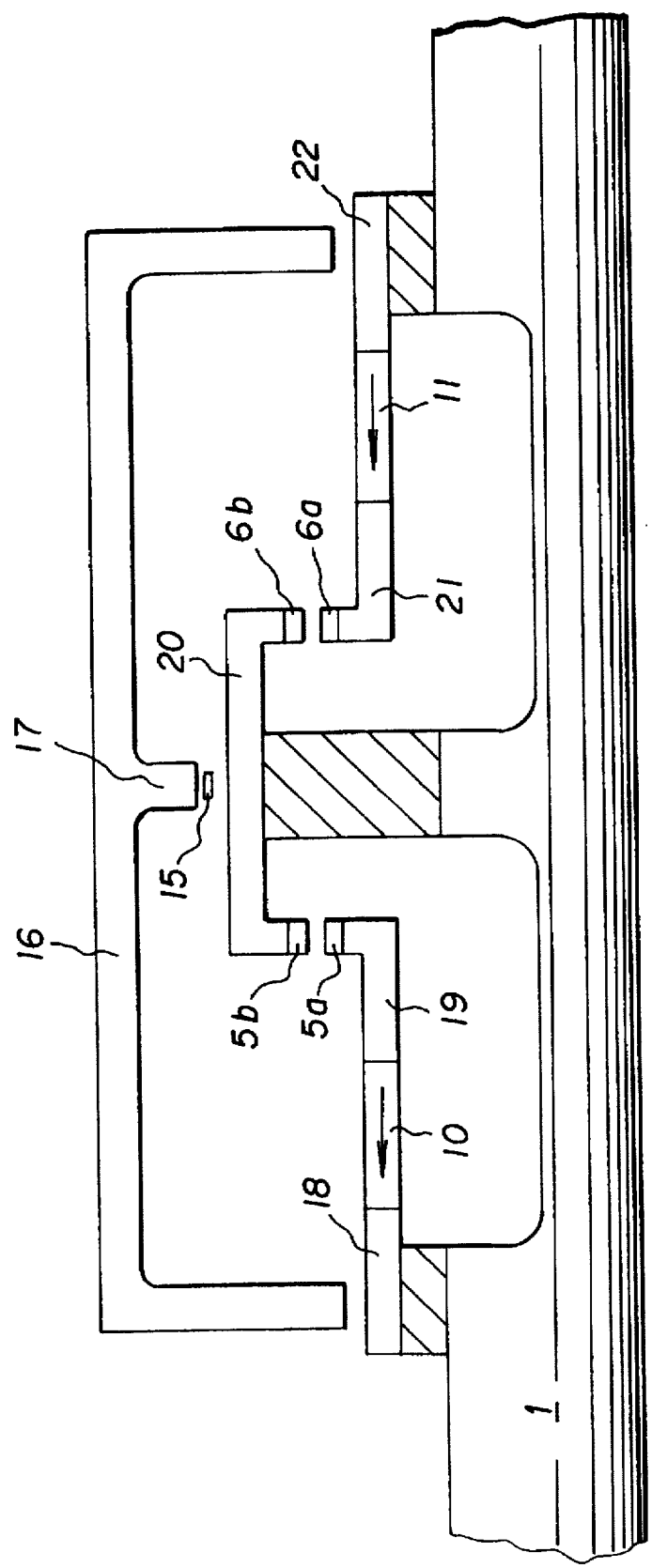

FIG. 5 shows another variant in which the magnets 10 and 11 are placed on the rotor, the stator is formed by a single yoke 16 having the central yoke part 17 corresponding to the common yoke 13 in FIG. 1, and the toothing of each circuit is said to be radial, that is to say arranged concentrically on planes cutting the shaft transversely. The part the rotor comprises three parts, two end parts each including two yokes 18, 19 and 21, 22 surrounding a magnet 10 or 11 and having teeth, respectively 5a and 6a, oriented radially outwards at one end, and a central part forming the central yoke 20 and having the teeth 5b and 6b directed radially towards the teeth 5a and 6a respectively. The operation of this embodiment may immediately be deduced from that described for the embodiment of FIG. 1 and therefore does not need to be described in more detail here.

Figure 6:
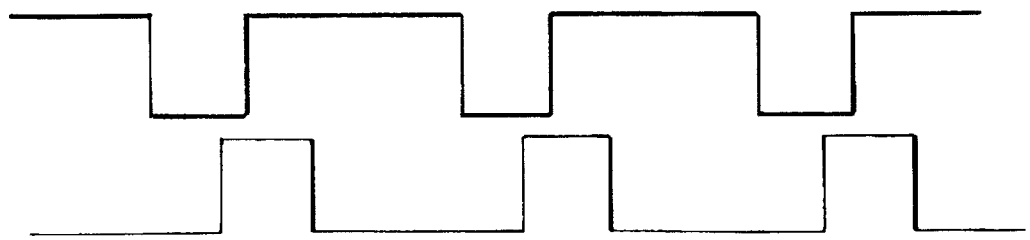
FIGS. 6 to 9 represent diagrammatically, in expanded view, profiles of toothing according to four variants.
Figure 7:
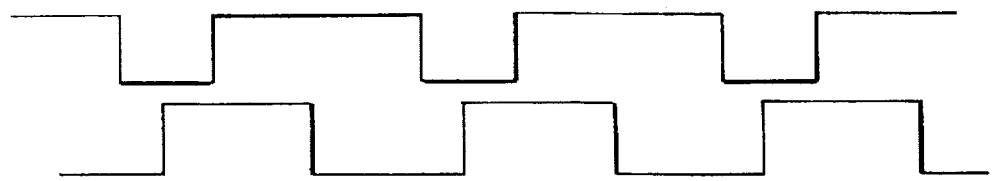
Figure 8:
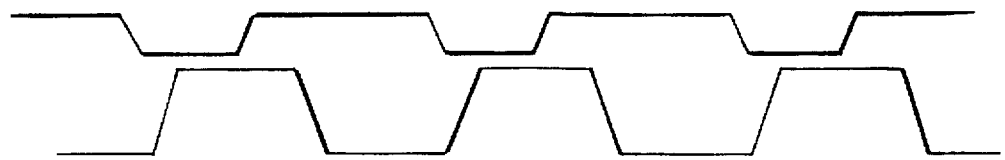
Figure 9:
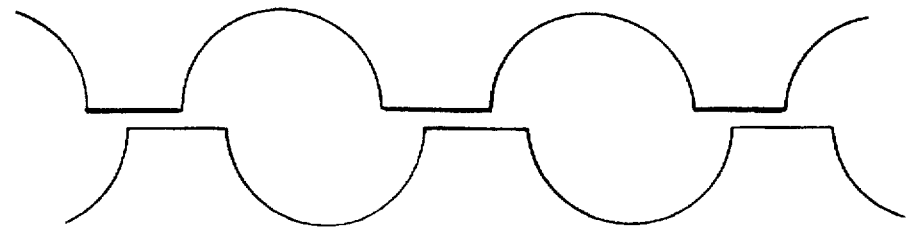

FIGS. 6 to 9 represent embodiment variants of the toothing according to the invention, the teeth being rectangular in FIGS. 6 and 7, trapezoidal in FIG. 8 and in the form of circular arcs in FIG. 9.

Figure 10:
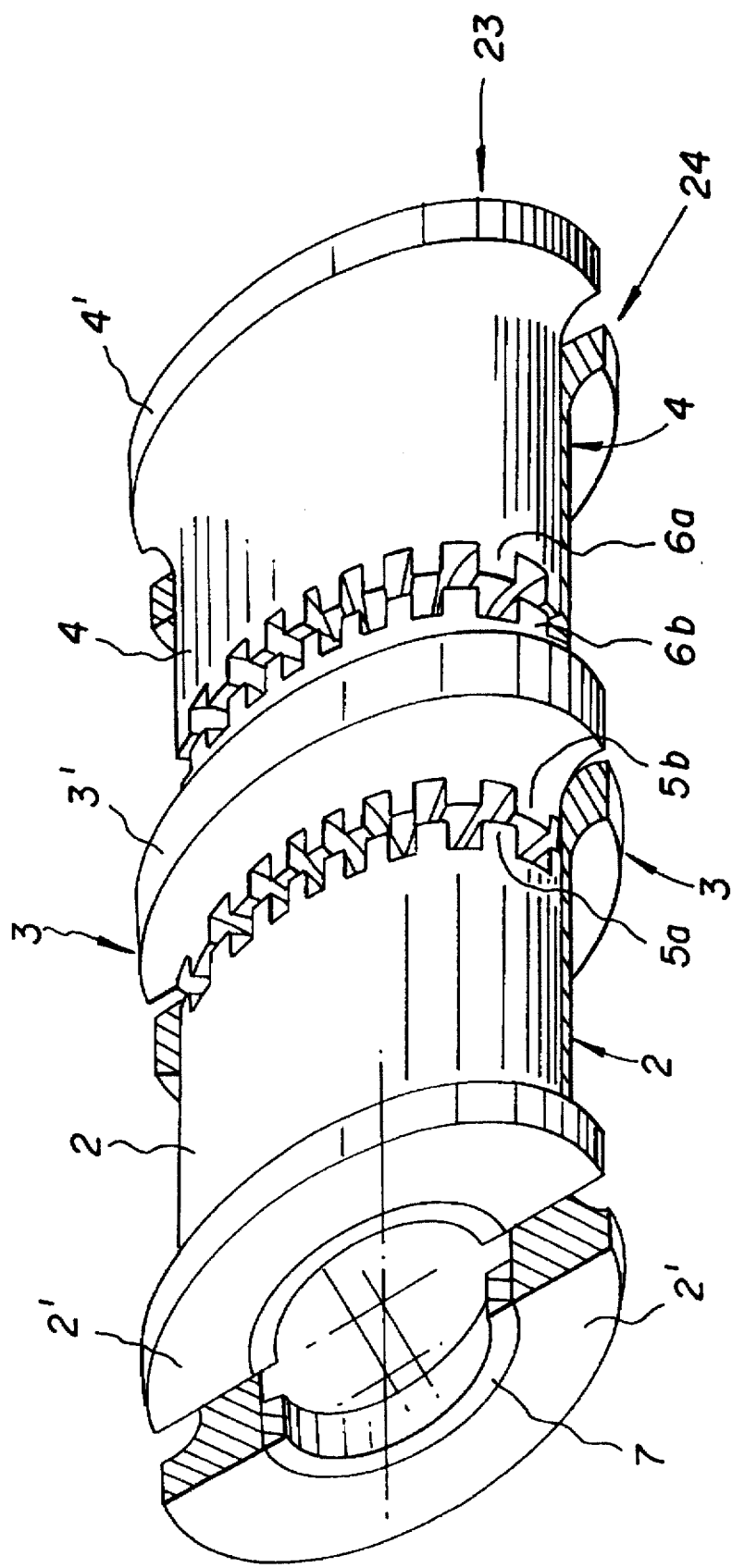
FIG. 10 represents diagrammatically, and in perspective, one particular embodiment of a rotor made in two symmetrical parts.

FIG. 10 shows, in perspective, a circuit the rotor, formed by two assemblies 23 and 24 which are symmetric with respect to a plane passing through the axis of the shaft (not shown) and are to be fixed to this shaft. Aside from the two-part construction, the structure is identical to that in FIG. 1 and the numerical references remain the same. The assembly 24 also comprises the sets of teeth, even if these are not visible in the figure.

It should be noted that, in this figure, the respective positions of the teeth have not been represented accurately. On this subject, FIGS. 2 and 3 are the figures for reference.

Figure 11:
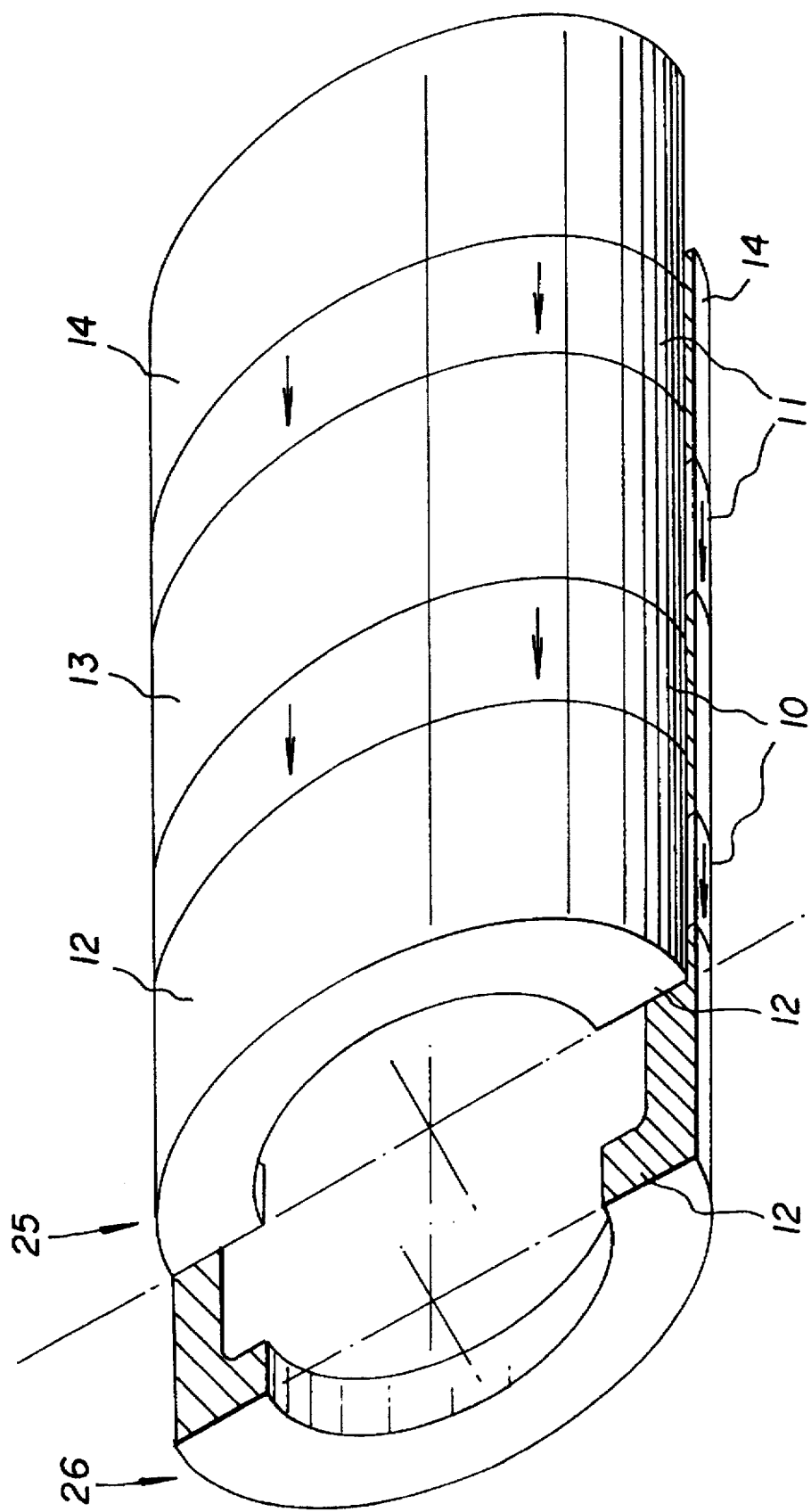
FIG. 11 represents the stator, diagrammatically and in perspective, also in two parts, associated with the rotor of FIG. 10.

FIG. 11 shows the circuit the stator formed by two symmetric parts 25 and 26 which are intended to come opposite the parts 23 and 24 of the circuit the rotor of FIG. 10. Aside from the two-part construction, the structure is identical to that of FIG. 1 and the numerical references remain the same.

The cylindrical assemblies forming the measurement devices in accordance with the invention may especially take the form of two-part or three-part sleeves.

We claim:

1. Device for measuring the torsional moment being exerted on a shaft, the device including two magnetic circuits, essentially cylindrical and arranged around the shaft, each of said circuits being equipped with at least one permanent magnet generating a magnetic flux and each of said circuits including, on a rotor, a variable air gap having two facing relative parts each fastened to the shaft at respective points offset with respect to each other in the longitudinal direction of the shaft in such a manner that torsion of the shaft leads to modification of the air gap which differs depending on the direction of the torque exerted, the two magnetic circuits including a common central yoke part in which magnetic fluxes of each of the circuits pass in opposite directions, the device including at least one measurement means sensitive to the algebraic sum of the magnetic fluxes.

2. Device according to claim 1 wherein parts defining each air gap have an initial nonsymmetrical position such that the two air gaps are modified differently when a torque is exerted on the shaft, application of a torque in a first direction leading to an increase in reluctance of one of said air gaps and a decrease in reluctance of the other of said air gaps, and conversely for a torque in a second opposite direction.

3. Device according to claim 1 wherein the air gaps are designed or adjusted so that, in the absence of torque being exerted on the shaft, the measurement means reads a zero reference value on either side of which lie increasing torque values corresponding to the torques being exerted respectively in a first direction and in a second opposite direction.

4. Device according to claim 1 wherein the air gaps are designed or adjusted so that, for a certain torque being exerted on the shaft, the measurement means reads a zero reference value.

5. Device according to claim 1 wherein a stator of the two magnetic circuits together with the common central yoke part comprise a single piece, the measurement means being fixed on the central yoke part.

6. Device according to claim 5 wherein the magnets are carried on a stator by three stator yokes, two of said yokes being end yokes and one of said yokes being the central yoke part, said three yokes facing two end and one central rotor yokes.

7. Device according to claim 6 wherein respective widths of the facing yokes are different so as to limit influence of axial play between the rotor and the stator on the measurement means.

8. Device according to claim 5 comprising a single stator yoke placed opposite four rotor yokes carrying the magnets.

9. Device according to claim 1 wherein parts defining the air gaps extend in a form of rings concentric with the axis of the shaft.

10. Device according to claim 9 wherein the rings lie within planes, said planes being different and orthogonal to the longitudinal axis of the shaft.

11. Device according to claim 9 wherein the rings lie within the same plane orthogonal to the axis of the shaft.

12. Device according to claim 1 wherein the air gaps are each formed by a set of teeth extending in a form of a ring a short distance from the shaft.

13. Device according to claim 12 wherein a shape of the teeth is selected from the group consisting of square-shaped, rectangular-shaped, trapezoidal-shaped and a shape delimited by circular arcs.

14. Device according to claim 1 wherein the magnets are placed on a stator.

15. Device according to claim 1 wherein the magnets are placed on the rotor.

16. Device according to claim 1 wherein the permanent magnets are selected from the group consisting of cylindrical magnets made as a single piece and a plurality of individual magnets having equal lengths and parallel magnetizations.

17. Device according to claim 5 further including adjustment means for balancing the device in an absence of torque so as to make the flux in the central yoke part zero.

18. Device according to claim 1 wherein parts defining the air gaps are fixed to the shaft by means of rotor yokes, stator yokes being arranged opposite the rotor yokes.

19. Device according to claim 18 wherein the parts defining the air gaps are separated from the shaft by non-magnetic spacers.

20. Device according to claim 1 wherein the measurement means is selected from the group consisting of Hall probes and magneto-resistors.

* * * * *